United States Patent

[11] 3,612,815

| [72] | Inventor | John F. Hinrichs |
| | | Menomonee Falls, Wis. |
| [21] | Appl. No. | 3,268 |
| [22] | Filed | Jan. 16, 1970 |
| [45] | Patented | Oct. 12, 1971 |
| [73] | Assignee | A. O. Smith Corporation |
| | | Milwaukee, Wis. |

[54] ELECTRON BEAM APPARATUS
2 Claims, 3 Drawing Figs.

[52] U.S. Cl. ........................................... 219/121 EB, 29/33
[51] Int. Cl. ........................................... B23k 15/00
[50] Field of Search ........................................... 219/121, 121 EB, 72, 80, 79; 198/19; 29/33

[56] References Cited
UNITED STATES PATENTS

| 2,987,610 | 6/1961 | Steigerwald | 219/117 |
| 3,114,829 | 12/1963 | Libby | 219/124 |
| 2,816,231 | 12/1957 | Nygard | 219/121 |
| 3,020,389 | 2/1962 | Gorman | 219/72 |
| 3,206,336 | 8/1965 | Hora | 148/1.5 |
| 3,430,029 | 2/1969 | Hinrichs | 219/121 |
| 3,441,709 | 4/1969 | Martocci | 219/121 |

*Primary Examiner*—J. V. Truhe
*Assistant Examiner*—Robert E. O'Neill
*Attorney*—Andrus, Sceales, Starke & Sawall ABSTRACT: The side member and crossmember of a vehicle frame are mounted in a fixture within a sealed welding chamber at a welding station and a plurality of electron welding guns are arranged along a weld line for simultaneous welding of the several components of the frame with the beams of the guns overlapping to provide an uninterrupted continuous weld. A loading station and an unloading station is mounted to the opposite sides of the welding station and connected thereto by a vacuum lock transfer station. The welded frame is coated with a protective metal such as aluminum or zinc by passing the welded frame through a metal vapor-depositing chamber disposed immediately in-line following the welding chamber.

PATENTED OCT 12 1971  3,612,815

INVENTOR
JOHN F. HINRICHS
BY
Andrus, Sceales, Starke & Sawall
Attorneys

ELECTRON BEAM APPARATUS

This application is a division of application Ser. No. 726,341 filed May 3, 1968 now U.S. Pat. No. 3,535,489 and relates to an electron beam welding apparatus and particularly to the creation of an elongated weld such as the longitudinal seam or interconnecting line of vehicle frame components and the like.

Electron beam welding has certain advantages over the more conventional arc welding so widely employed in industry. Electron beam welding eliminates the need for welding wire, the conventional shielding gas and other similar components. Electron beam welding as such is also extremely rapid and can be readily automated to eliminate the necessity of skilled operators while maintaining highly satisfactory final welds. Further, the automated equipment, although relatively expensive initially and requiring a substantial initial investment, requires a minimal amount of maintenance and is adapted therefore to volume production.

Applicant's copending application entitled ELECTRON BEAM WELDING OF RIMMED CARBON STEEL which was filed Jan. 6, 1967 with Ser. No. 607,826 now U.S. Pat. No. 3,529,122 particularly discloses an improved electron beam welding method and apparatus for the welding of low-carbon steel such as employed in vehicle frames and tubular pipes for gaslines.

Generally, in accordance with the present invention, a plurality of electron beam guns are spaced in accordance with the weld line. Each welding gun is mounted with a valve means between the accelerating chamber of the electron beam gun and a welding chamber. This permits establishment of a relatively high vacuum in the acceleration chamber and protects the cathode filament from oxidation. The valve is opened during the welding process. The workpiece is clamped in position with a single welding chamber provided to opposite sides of the complete weld area. The valve means between the acceleration chambers of the individual guns and the welding chamber is opened and the electron guns simultaneously or sequentially actuated to establish a series of individual welds which can be overlapped to form a continuous weld. Each of the guns is arranged with a suitable means to deflect the welding beam along a predetermined length of the final weld and particularly to provide the slight overlap of the adjacent weld. Applicant has found that the final weld is equally as good as a single continuous weld as provided by establishing relative movement between the welding gun and the work.

The multiple gun construction of this invention is applied to the simultaneous welding of a plurality of parts. For example, in the welding of a vehicle frame member, a plurality of side member and crossmember must be interconnected. In accordance with the concept of the present invention, a fixture would be provided within a welding chamber within which all of the parts would be assembled. A plurality of electron welding guns are interconnected as a part of the assembly to provide a plurality of weldments for simultaneously interconnecting the several components of the frame. As a matter of practical commercial production, a loading and an unloading station may be provided to the opposite sides of a welding station and connected thereto by a vacuum lock unit to reduce the problems of maintaining the welding chamber under a sufficient vacuum for welding purposes. The completed frame unit can also be coated with a protective metal such as aluminum or zinc in a very convenient manner to eliminate the subsequent necessity of painting of the frame. Thus, a metal vapor-depositing chamber can be provided immediately in line following the welding chamber.

Thus, the present invention provides a highly satisfactory means of automated welding of elongated weld areas with an electron beam welding unit.

The drawings furnished herewith illustrate preferred applications and constructions of the present invention in which the above advantages and features are clearly disclosed as well as others which will be readily understood from the following description.

Figure 2:
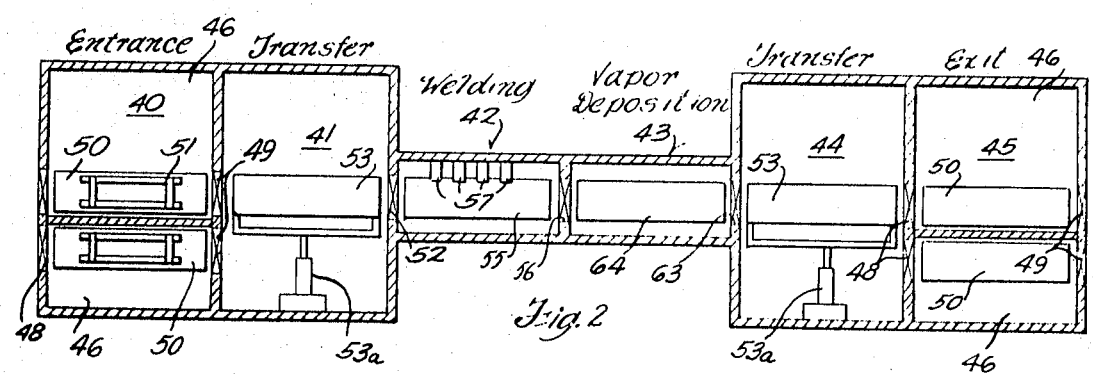
FIG. 2 is a diagrammatic plan view of the invention applied to the welding of a complete frame assembly.

Referring particularly to FIG. 2, an embodiment of the present invention is shown employing a plurality of electron beam welding guns for simultaneously welding a complete frame structure.

Figure 3:
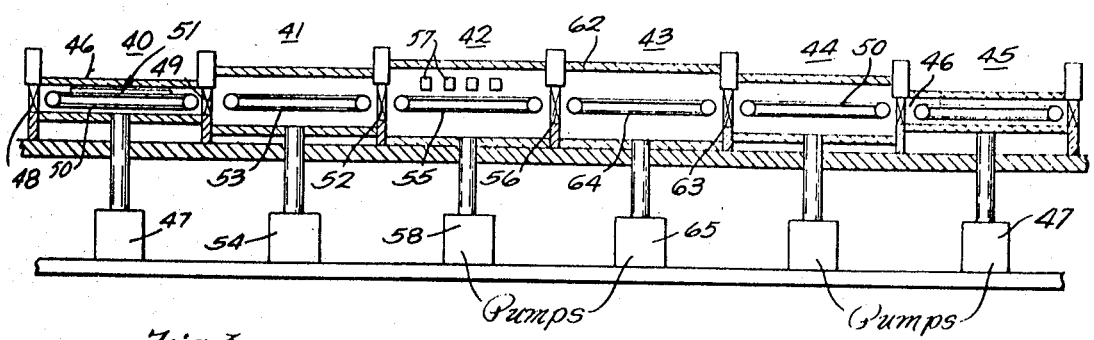
FIG. 3 is a side elevational view of FIG. 2.

In the embodiment of the invention illustrated in FIGS. 2 and 3, a complete line is diagrammatically shown including an entrance or assembly station 40, a load transfer station 41, a welding station 42, a vapor-depositing station 43, an unload transfer station 44 and a exit station 45.

The entrance and exit stations 40 and 45 similarly include a plurality of side-by-side lock chambers 46 each of which is connected to a mechanical pump 47 or other suitable means to reduce the pressure to 100 microns. A pair of lock chambers 46 is shown although in actual production a greater number may be desired to permit time for loading of the preassembled frame units into any one of the several chambers 46, pumping of the individual chamber and movement into the transfer station 41, as presently described. Thus, whereas the reduction of the vacuum in the load chamber may require a full minute, the frame units 51 may be completely welded in the order of 6 seconds.

The lock chambers 46 are similarly constructed and each chamber is sealed at the opposite ends by suitable vacuum gate valves 48 and 49 shown as sliding door units. Further, a conveyor 50 in each chamber 46, shown as an endless belt which rotates in a direction across the width of the chambers is provided to automatically move a frame unit 51 or the like through the respective chambers 46 and into the loading transfer station 41 and out of the unload transfer station 44 into exit station 45. The preassembled frame unit 51 is mounted or assembled within the several lock chamber 46 and the vacuum is established.

The preassembled frame units 51 are transferred into the transfer station 41 by one of the conveyors 50 and station 41 is sealed at the one end by the gate valves 49 and at the other end by a similar exit valve 52. A conveyor 53 in station 41 which like conveyors 50 rotates across chamber 41 to receive the frame unit 51 from a conveyor 50, is movable laterally by a drive means 53a into alignment with the several entrance chambers 46 and the exit valve 52. The chamber or station 41 is held at a substantially greater vacuum than chambers 46; for example, one-tenth of a micron. Such vacuum can be readily maintained by continuous pumping with a proper mechanical and diffusion pump 54.

The frame units 51 are then sequentially fed by conveyor 53 through the gate valve 52 into the electron beam welding chamber or station 42 which is also provided with a conveyor 55 to receive frame unit 51 and closed at the far end by a valve 56. In this station, a substantial number of welding guns 57 are mounted, as diagrammatically illustrated, to simultaneously establish a plurality of different welds. A vacuum pump 58 is connected to the chamber to establish a vacuum of one-tenth of a micron which is suitable for welding. The guns 57 can be simultaneously actuated to effect a weld of predetermined areas with adjacent beams overlapping to provide elongated welds.

Figure 1:
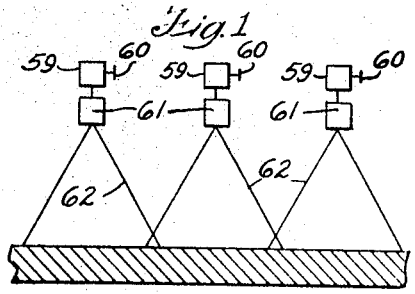
FIG. 1 is a diagrammatic illustration of the deflection pattern of the electron beams of the multiple electron beam welding apparatus.

Referring to FIG. 1, the electron beam welding guns shown in FIGS. 2 and 3 are illustrated by the emitter 59 which is actuated by opening valves 60. The beam from the guns is encircled by a focusing coil and deflection electromagnets illustrated diagrammatically at 61 constituting control means which may be employed to deflect the beams 62 along the line of weld, as illustrated in FIG. 1, to provide a continuous uninterrupted weld. For a more detailed description of the welding guns, reference may be had to FIG. 2 of the parent application, Ser. No. 726,341 referred to heretofore, wherein an emitter 18 is shown as actuated when valve 26 is rotated to open position to establish a beam 17 which is deflected by magnet 29. The beam then takes a path through the focusing coil 30 and electromagnets 31, illustrated in FIG. 1 of this application diagrammatically by the boxes 61. Commercially available electron beam guns can each establish a weld of approximately 4 inches in length at a speed of approximately 40 inches a minute. In other words, each gun would take approximately 6 seconds to effect its weld. An automotive frame of a conventional construction normally takes between approximately 800 inches of weld. Thus, by properly locating 200 electron beam guns, the complete frame can be welded into a unitary structure in 6 seconds.

The electron beam process is capable of welding in any position and consequently the several channel sections, body brackets and intermediate crossbars of the usual vehicle frame can be all welded simultaneously into a completed welded frame. Further, as previously described, each weld gun can be controlled by a suitable programmed means to move the beam all through X, Y and Z coordinates and thus can move along a complex path.

After the completion of the welding process, the frame unit 51 is passed by conveyor 55 into the vapor-depositing station 43 which is separated from the weld chamber by the valve 56 and closed at the far or exit end by a gate valve 63. The vapor-depositing chamber 43 includes a conveyor 64 which rotates across the chamberlike conveyor 53 and receives the frame unit 51 and is connected to vacuum pump 65 to hold a vacuum in the order of one-tenth of a micron. Within the chamber 43, metal vaporizing and depositing unit 66 applies aluminum, zinc, or any other material as a thin protective metallic film on the frame unit in accordance with well-known techniques. After the complete coating of the frame unit, it is passed through the exit gate valve 63 by conveyor 64 into the discharge transfer station 44 and then the exit station 45 which respectively correspond to that of the load transfer station 41 and entrance station 40.

This includes conveyors 53 and 50 respectively which receive and transfer the completed frame unit through the station 44 and into a respective lock chamber of exit station 45. Another drive means 53a in chamber 44 is provided to move conveyor 53 into alignment with one of the gate valves 48 to transfer the welded frame unit by conveyor 53 onto a conveyor 50 in one of the chambers 46 of exit station 45 from where it is discharged through a gate valve 49 by one of the conveyors 50.

The present invention thus provides a very satisfactory means for the automatic control of production welding of multiple component items.

Various modes of carrying out the invention are contemplated as being within the scope of the following claims, particularly pointing out and distinctly claiming the subject matter which is regarded as the invention.

I claim:
1. An electron beam welding apparatus for welding a metal workpiece which is preassembled for welding simultaneously along a plurality of weld lines, the welding apparatus comprising
   a plurality of electron beam guns mounted in laterally spaced relation to each other along each weld line and having focusing means for directing electron beams to each weld line and deflecting means for overlapping said electron beams to simultaneously completely cover each weld line.
   control means for actuating said plurality of electron beam guns simultaneously to completely weld the workpiece at the weld lines,
   a welding chamber enclosing the workpiece and electron beams and having first vacuum means for maintaining said welding chamber at a vacuum suitable for electron beam welding,
   first and second transfer chambers, one each connected with opposite ends of said welding chamber and having second vacuum means for maintaining said transfer chambers at a vacuum approaching the vacuum in said welding chamber,
   first and second gate means, one each for respective first and second transfer chambers for selectively opening into said welding chamber,
   a plurality of loading chambers connected to said first transfer chamber and having third vacuum means for reducing the pressure in said loading chambers below ambient pressure,
   third gate means for each loading chamber for selectively opening into said first transfer chamber,
   a plurality of unloading chambers connected to said second transfer chamber and having fourth vacuum means for reducing the pressure in said unloading chambers below ambient pressure,
   fourth gate means for each unloading chamber for selectively opening into said second transfer chamber, and
   transfer means for moving the workpiece from said loading chambers through subsequent chambers by way of said gates.
2. The apparatus of claim 1 and including a vapor deposition chamber connected between said welding chamber and said second transfer chamber, said vapor deposition chamber having fifth vacuum means for maintaining said vapor deposition chamber at a vacuum approaching the vacuum in the welding chamber, and said second gate means includes intermediate gate means for opening the transfer chamber into the vapor deposition chamber and the vapor deposition chamber into the welding chamber.